UNITED STATES PATENT OFFICE.

FRANKLIN C. SMITH, OF LOS ANGELES, CALIFORNIA.

PROCESS OF AND COMPOSITION FOR PRESERVING EGGS.

SPECIFICATION forming part of Letters Patent No. 602,795, dated April 19, 1898.

Application filed March 27, 1896. Serial No. 585,092. (No specimens.)

*To all whom it may concern:*

Be it known that I, FRANKLIN C. SMITH, a citizen of the United States, residing at Los Angeles, in the county of Los Angeles and State of California, have invented a new and useful Improvement in the Art of and Compound for Preserving Eggs, of which the following is a specification.

The object of my invention is to produce extremely simple and cheap means for preserving eggs for as long a time as is ordinarily desirable—that is, from the egg-laying season to the time when eggs become scarce and advance in price.

An especial object of my invention is to provide means whereby my invention may be practiced without any especial machinery or appliances, so that it is adapted for use by private families as well as commercially.

My invention comprises the improvement in the art of preserving eggs which consists in treating the shells with gum held in solution in gasolene, either with or without the addition of soap thereto.

The compound which I have found in practice to be the most effective is as follows, giving the proportions for a little more than one gallon of the compound: gasolene, (of the ordinary commercial quality,) one gallon; gum-arabic, one ounce; borax soap, (of the ordinary commercial quality,) one-half ounce. To prevent evaporation, the gasolene should be placed in an air-tight vessel, preferably of glass, since it will corrode tin, and the gum-arabic and soap are each dissolved separately in a small quantity of hot water and mixed with the gasolene. The water does not act as a preservative, but is used as a means for quickly and conveniently placing the gum and soap in solution. When gum-shellac is used, it must be first dissolved in alcohol. Any other odorless vehicle found suitable for placing the gum and soap in solution may be employed, and I do not limit my claim to such vehicle. Ordinarily the emulsion thus produced does not separate; but before using it is wise to mix it thoroughly.

When it is desired to preserve eggs, a sufficient quantity of a compound is poured into a suitable vessel and the eggs are dipped therein either by means of a wire basket or in any other suitable way, or, if deemed preferable, the eggs may be placed in a wire basket or any other receptacle and the compound poured over the eggs, it only being necessary that every portion of the shell be treated with the compound. As soon as the eggs have been immersed or thoroughly covered with the compound they should be removed and allowed to dry, being subjected to the action of the compound for the shortest time possible. After treatment the eggs may be packed in sawdust, hay, straw, or other suitable material or may be placed upon open racks. I find in practice that I secure better results by placing the treated eggs upon racks in a dark cool place, with the small end down, and in such a manner that the air is free to circulate around the eggs. It is not necessary to turn the eggs; but the temperature should not at any time exceed seventy degrees nor fall low enough to freeze.

I have secured good results by employing gum-shellac instead of gum-arabic, and I do not limit my claim to any special kind of gum, but would broadly claim any gum which will accomplish the purpose when made into solution with gasolene. When I have used the compound consisting of gasolene, gum-arabic, and borax soap I have made from eggs preserved for ten months by this process custard of as fine a quality as can be made from newly-laid eggs.

By employing the gasolene it soon evaporates from the shell, so that it does not have time to penetrate through the membrane of the egg, which would give the egg a disagreeable flavor or odor.

It will be noted that I employ a comparatively small quantity of gum and soap with the gasolene, and that therefore the coating left upon the egg-shell after treatment must be and is scarcely perceptible. In fact, practically all the residue is left in the pores of the shell and without changing its appearance forms the shell into a practically air-tight vessel.

Eggs treated according to my invention cannot be told from new-laid eggs, either by smell or sight, even after the lapse of many months.

I have always used borax soap in my experiments for the reason that I have always secured the desired results by its use; but I do not limit my invention to borax soap, but claim my compound when made with any soap suitable for the purpose.

Now, having described my invention, what I claim as new, and desire to secure by Letters Patent, is—

1. The improvement in the art of preserving eggs which consists in treating the shells with gum held in solution in a suitable vehicle and mixed with gasolene, substantially as set forth.

2. The improvement in the art of preserving eggs which consists in treating the shells with gum and soap held in solution in a suitable vehicle and mixed with gasolene, substantially as set forth.

3. The improvement in the art of preserving eggs which consists in treating the shells with gum-arabic and borax soap held in solution in a suitable vehicle and mixed with gasolene, substantially as set forth.

4. The compound for preserving eggs consisting of gum-arabic dissolved in a suitable vehicle and mixed with gasolene, substantially as set forth.

5. The compound for preserving eggs which consists of gum-arabic, and soap, dissolved in a suitable vehicle and mixed with gasolene, substantially as set forth.

6. The compound for preserving eggs which consists of gum-arabic, and borax soap dissolved in a suitable vehicle and mixed with gasolene, substantially as set forth.

FRANKLIN C. SMITH.

Witnesses:
 ALFRED I. TOWNSEND,
 JAMES R. TOWNSEND.